United States Patent [19]
Lee et al.

[11] Patent Number: 5,818,296
[45] Date of Patent: Oct. 6, 1998

[54] FSK DEMODULATOR USING GOERTZEL'S DISCRETE FOURIER TRANSFORM

[75] Inventors: Ho Lee, Bridgewater, N.J.; Allan B. Lamkin, San Diego, Calif.; Simha Erlich, Haifa, Israel

[73] Assignee: Hughes Electronics Corporation, El Segundo, Calif.

[21] Appl. No.: 877,680

[22] Filed: Jun. 17, 1997

[51] Int. Cl.$^6$ .................................................. H04L 27/48
[52] U.S. Cl. ........................... 329/300; 375/324; 375/334
[58] Field of Search ..................................... 329/300, 301, 329/302, 303; 375/324, 334

[56] References Cited

U.S. PATENT DOCUMENTS

| | | | |
|---|---|---|---|
| 4,612,509 | 9/1986 | Betts et al. ............................... | 329/302 |
| 4,726,041 | 2/1988 | Prohaska et al. ......................... | 329/300 |
| 5,287,516 | 2/1994 | Schaub ..................................... | 329/300 |

*Primary Examiner*—Siegfried H. Grimm
*Attorney, Agent, or Firm*—Michael W. Sales; John T. Whelan

[57] ABSTRACT

A frequency shift keyed demodulator system employs a first bandpass filter having a passband centered at a first frequency; a second bandpass filter having a passband centered at a second frequency; a first Goertzel's discrete Fourier transform processor coupled to an output of the first bandpass filter; a second Goertzel's discrete Fourier transform processor coupled to an output of the second bandpass filter; and an adder coupled to an output of the first Goertzel's discrete Fourier transform processor, and to an output of the second Goertzel's discrete Fourier transform processor.

10 Claims, 2 Drawing Sheets

FSK DEMODULATOR USING GOERTZEL'S DISCRETE FOURIER TRANSFORM

BACKGROUND OF THE INVENTION

The present invention relates to data communications systems and, more particularly, to a communication system for transmitting and receiving data through a radio frequency (RF) channel that is subject to noise and channel fades.

Communications channels, such as wireless radio frequency (RF) channels for use between a mobile station (i.e., mobile radio) and other mobile stations or a base station, are subject to Rayleigh and/or Rician fading and often Gaussian or white noise distortions. An example of one such RF communications channel is a 900 Megahertz (MHZ) channel for use in cellular communications. Wired communications channels and other wireless communications channels, such as satellite communications channels, also may be subject to fading and/or noise distortions.

Heretofore known modem approaches conforming, for example, to the V.21 FSK and Bell 103 standards suffer from high bit-error rates when operated over a communications channel subject to Rayleigh fading and/or noise distortions. These high bit-error rates translate into high packet-error rates, where either a packet length has been changed or the packet has been dropped altogether. Errors in start of frame (SOF) bytes, end of frame (EOF) bytes and/or packet length bytes are the predominant cause of packet errors. In an asynchronous data transmission mode, errors in either the start or stop bits of one or more of the bytes within a packet can cause byte deletion. High channel noise can cause random byte insertion into the packet. In the case of byte insertions or byte deletions, packet length errors may be introduced.

An example of a heretofore known V.21 FSK or Bell 103 compliant data modem demodulator 100 is shown in FIG. 1, which is representative of currently commercially available modems. In accordance with the example shown, an input signal 102 is passed through a multiplier 104, which multiples the input signal 102 by a gain signal 106 from an automatic gain control device (not shown). The input signal 102 is next passed into a bandpass filter 108, the output of which is passed to a multiplier 112 and to a (−PI/2) delay 114. The output 116 of the (−PI/2) delay 114 is also passed to the multiplier 112, and the output 118 of the multiplier 112, i.e., the product of the output 110 of the bandpass filter 108, and the output 116 of the (−PI/2) delay 114, is passed to a low pass filter 120. The output 122 of the low pass filter 120 is passed to a bit extractor 124, and an output 126 of the bit extractor 124 serves as a system output for the modem demodulator 110.

The example modem demodulator 100 shown in FIG. 1 mixes the input signal 102, which is a noisy signal, with a delayed version of itself, i.e. the output 116 of the (−PI/2) delay 114. Due to the short, i.e., (−PI/2), delay, the noise at the two inputs of the multiplier 112 is correlated, and thus produces a signal dependent DC offset at the output 118 of the multiplier 112. In this way, the approach shown attempts to minimize the effects of noise on the output 126 ultimately generated.

SUMMARY OF THE INVENTION

The present invention provides a demodulation approach for receiving data through a radio frequency (RF) channel that is subject to noise and channel fades.

The invention, in some embodiments, can be characterized as a frequency shift keyed demodulator system. Such system may employ a first bandpass filter having a passband centered at a first frequency; a second bandpass filter having a passband centered at a second frequency; a first Goertzel's discrete Fourier transform processor coupled to an output of the first bandpass filter; a second Goertzel's discrete Fourier transform processor coupled to an output of the second bandpass filter; and an adder coupled to an output of the first Goertzel's discrete Fourier transform processor, and to an output of the second Goertzel's discrete Fourier transform processor.

In other embodiments, the invention can be characterized as a method for demodulation of a frequency shift keyed signal. The method involves filtering an input signal with a first bandpass filter; filtering the input signal with a second bandpass filter; performing a first Goertzel's discrete Fourier transform on a first output signal from the first bandpass filter; and performing a second Goertzel's discrete Fourier transform on a second output signal from the second bandpass filter.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
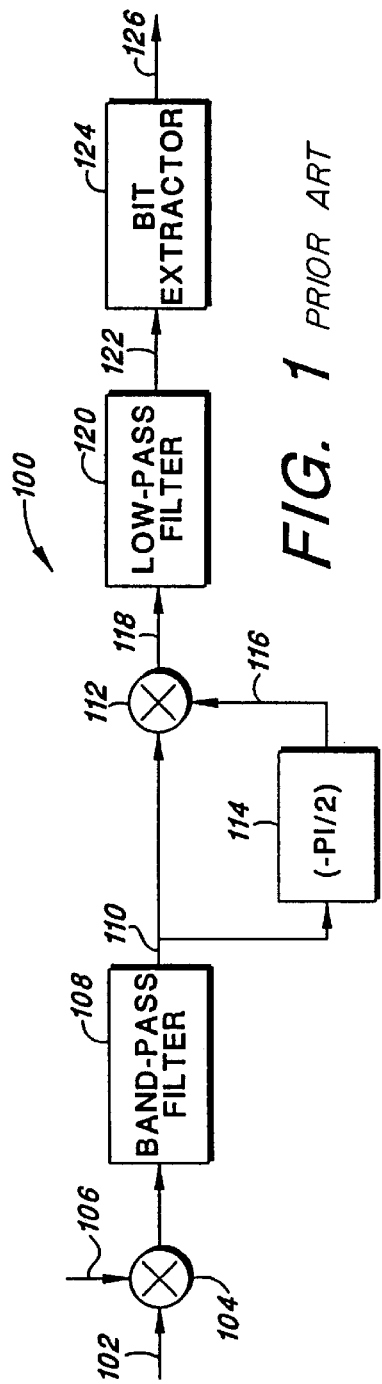
FIG. 1 is a block diagram of an example of a modem demodulator in accordance with the prior art.

Referring to FIG. 1, a block diagram is shown of an example of a modem demodulator 100 in accordance with the prior art. Explanation of such modem demodulator is made hereinabove in the BACKGROUND OF THE INVENTION.

Figure 2:
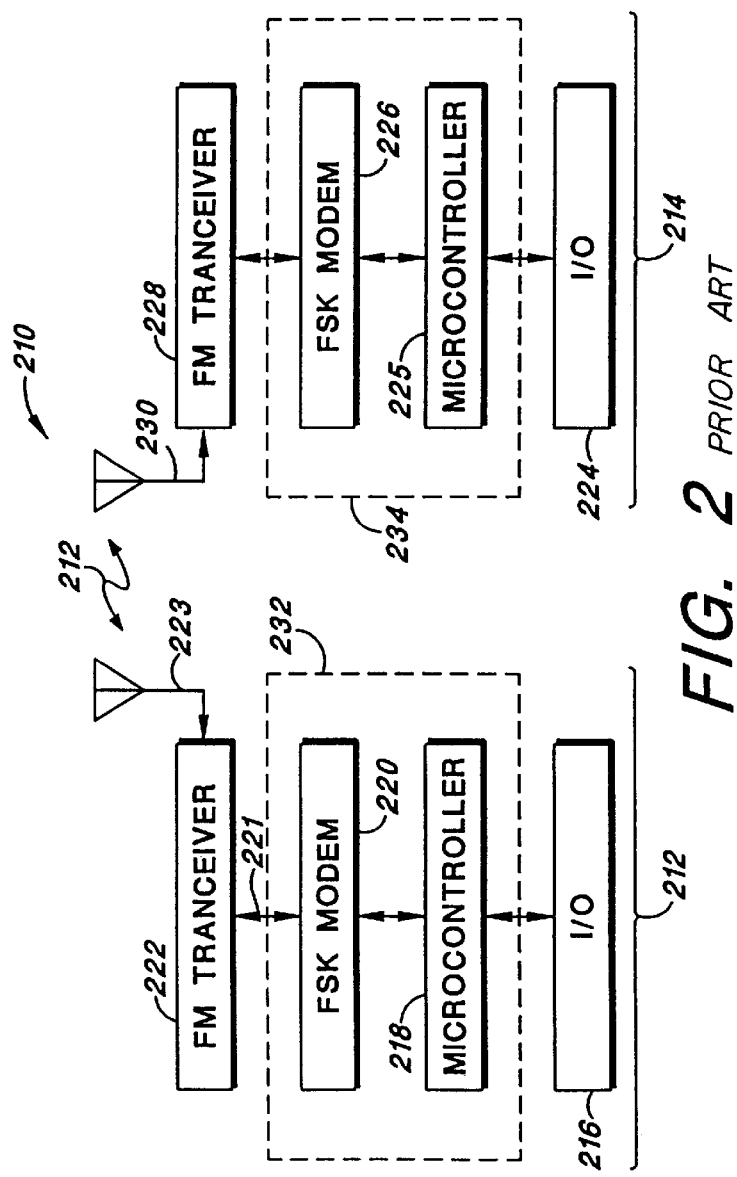
FIG. 2 is a block diagram of a communications system with which embodiments of the present invention can be utilized.

Referring to FIG. 2, a communication system 210 is shown. Data transmission over a wireless channel 212, e.g., an air channel, as shown, is subject to adverse conditions, such as Rayleigh fading, noise and signal strength attenuation. It will be appreciated, however, by the skilled artisan that teachings of the present embodiment are also applicable to wired communications channels, such as are typically used in Public Switched Telephone Networks (PSTN), which may also be subject to Rayleigh fading, noise and signal strength alterations.

The communication system 210 depicted includes a base station 212 and a mobile station 214, such as an automobile or mobile cellular telephone, however any two stations between which communications are desired, such as two mobile stations or two base stations, may benefit from the present embodiment.

The base station 212 includes, for example, an input/output interface 216, a microcontroller 218, a modem 220, an FM transceiver 222 and an antenna 223. The modem 220 is connected through, for example, a Public Switched Telephone Network 221 (PSTN 221) to a cellular station at which the FM transceiver 222 is located. The mobile station 214 similarly includes an input/output interface 224, a processor 225, a modem 226, a mobile digital FM transceiver 228 and antenna 230. The two modems 220, 226 communicate asynchronously using, for example, 300 baud FSK modulated signals.

The modems 220, 226 and their respective microcontrollers 218, 225 are embodied, preferably, in respective digital signal processors 232, 234 (DSPs).

In a typical application, the mobile station 214 is mounted in an automotive vehicle or is otherwise of a portable nature, either as a unit mounted in a vehicle or as an otherwise transportable or portable device, such as a handheld device, while the base station 212 is at a fixed land point defining a cell.

The improved FSK demodulation approach of the present embodiment improves data throughput, i.e., average data rate by reducing bit errors and thus packet errors as compared, for example, to the approach depicted in FIG. 1. This improved throughput allows the communication system 210 to work, for example, at a location near the edge of a cellular telephone cell, in an area having poor-signal levels and/or in extreme fading conditions. Under these conditions, communications service otherwise would not be available because the probability of getting a complete error-free data packet through the channel is very poor.

Figure 3:
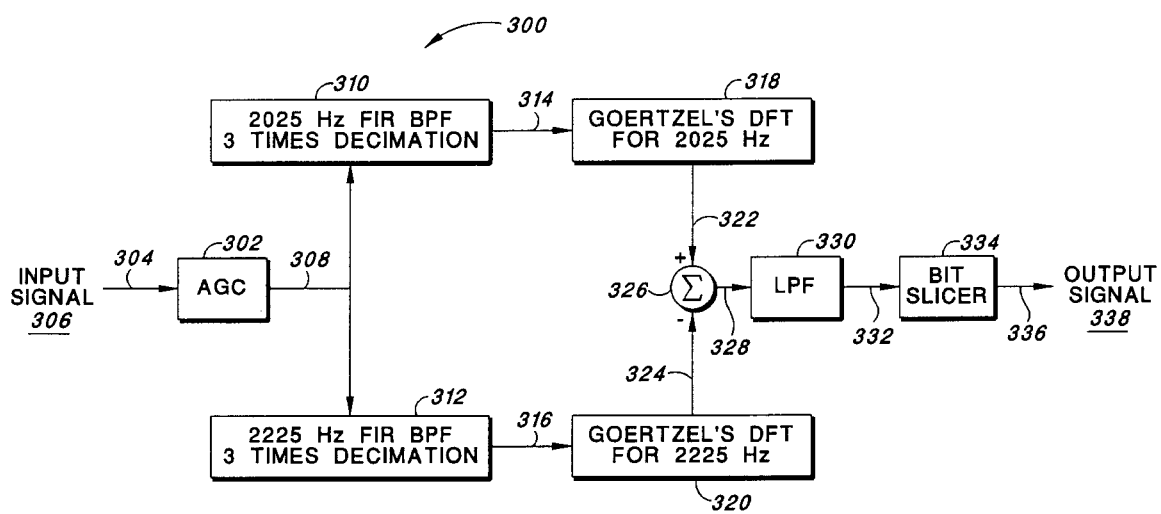
FIG. 3 is a block diagram of a modem demodulator system in accordance with an embodiment of the present invention and useable in the communications system of FIG. 2.

Referring next to FIG. 3, a block diagram is shown of a data modem demodulator system 300 useable with the communication system 210 (FIG. 2) described hereinabove.

Shown is an automatic gain control 302, the input 304 of which is coupled to an input signal 306 and the output 308 of which is coupled to two bandpass filters 310, 312. The first of the bandpass filters 310 is a finite input response filter with a pass band centered at 2025 Hz. The other of the bandpass filters 312 is a finite impulse response filter with its pass band centered at 2225 Hz. The respective outputs 314, 316 of bandpass filters 310, 312 are passed to respective Goertzel's Discrete Fourier Transform processors 318, 320 the outputs 322, 324 of which are coupled to an adder 326 that subtracts the output 324 of the Goertzel's Discrete Fourier Transform processor 320 associated with the 2225 Hz bandpass filter from the output of the Goertzel's Discrete Fourier-Transform processor 318 associated with 2025 Hz bandpass filter 310. The output 328 of the adder 326 is passed through a low pass filter 330, the output 332 of which is passed to a bit slicer 334. The output 336 of the bit slicer 334 provides an output signal 338 for the modem demodulator 300.

To decrease the "MIP" requirements, i.e., processing requirements, on a digital signal processor preferably used to implement at least the bandpass filters 310, 312 and the Goertzel's Discrete Fourier Transform processors 318, 320 of the present embodiment, samples at the inputs of the bandpass filters 310, 312 are down sampled to a lower sampling frequency so as to speed up (i.e., so as to reduce the number of samples that must be processed) subsequent demodulation processes. The bandpass filters 310, 312 are 35th order finite impulse response filters, and are tuned to the two FSK tones, i.e., 2025 Hz and 2225 Hz respectively, at an incoming sampling rate of 8100 samples per second. The bandpass filters' outputs 314, 316 are at a sample rate of 2700 samples per second. Due to this low sampling rate at the bandpass filters' outputs 314, 316, which effects a 3 to 1 decimation of the incoming signal, the Goertzel's Discrete Fourier Transformer processors 318, 320, which perform a four point modified Goertzel's algorithm, actually process aliases of the two input frequencies, i.e., aliases of 2025 Hz and 2225 Hz. These aliases are centered at 475 Hz and 675 Hz, respectfully. The modem demodulator 300 is, therefore, performing the process of down conversion to more convenient low frequencies, which enables a more efficient demodulation in the presence of noise. Outputs of the Goertzel's Discrete Fourier Transform processors 318, 320 are subtracted from each other and low pass filtered by the low pass filter 330. Decisions as to whether "mark" or "space" signals have been received are made by the bit slicer 334 by sampling the output 332 of the low pass filter 330 at appropriate times, in accordance with the phase of the input signal 306. The result of such sampling is compared to a threshold and a decision as to whether a "mark" or "space" was received is made by the bit slicer 334.

Each of the bandpass filters 310, 312 has 35 taps with a narrow pass band to minimize output noise. As mentioned above, these filters perform a 3 to 1 decimation from 8100 samples per second to 2700 samples per second in order to decrease processing requirements, i.e., execution time in subsequent demodulation stages. These bandpass filters are designed with Chebychev windowing (for "brick wall" spectral properties) with 35 db attenuation.

Further enhancements of the modem demodulator stability in very noisy environments can be achieved by decreasing the bandwidth of the two bandpass filters 310, 312. This can be achieved by increasing the order of the bandpass filters, i.e., by increasing the number of taps, however this is done at the expense of increasing processing requirements.

Each of the bandpass filters' outputs 314, 316 is processed by a respective Goertzel's Discrete Fourier-Transform processor 318, 320 using a four point (twice per baud) Goertzel's algorithm modified to include an attenuation factor of 0.9 (to increase stability).

The low pass filter 330 is a ninth order finite impulse response filter. The low pass filter 330 has a cutoff frequency of 900 Hz and uses a Hemming window.

As mentioned above, detection of a "mark" or "space" ("0" or "1", or "1" or "0", respectively) is performed by sampling the output of the low pass filter 330 at appropriate times and comparing such output to a zero threshold. A negative to positive transition, at the output 332 of the low pass filter 330, marks a beginning of a word, i.e., a data byte plus stop and start bits and optionally a parity bit. Four samples after the beginning of the word (in an exemplary embodiment bit timing is 1 bit every $\frac{1}{300}$ seconds, sampled at 1 sample every $\frac{1}{800}$ seconds, decimated by 3, which yields 9 samples per bit, such that the fifth sample is in the center of the word.) the low pass filter's output 332 is sampled by the bit slicer 334, and if the amplitude of the sample is positive, the bit slicer 334 declares (or detects) "mark", e.g., a "1". If the amplitude of the sample is not positive, the bit slicer 334 detects a "space", e.g., an "0". Subsequently, the output 332 of the low pass filter 330 is sampled every 9 samples (in accordance with baud rate) until a new positive to negative transition occurs in which case a new count of sampling instances is initiated.

While the invention herein disclosed has been described by means of specific embodiments and applications thereof, numerous modifications and variations could be made thereto by those skilled in the art without departing from the scope of the invention set forth in the claims.

What is claimed is:

1. A frequency shift keyed demodulator system comprising:
   a first bandpass filter having a passband centered at a first frequency;
   a second bandpass filter having a passband centered at a second frequency;
   a first Goertzel's discrete Fourier transform processor coupled to an output of the first bandpass filter;
   a second Goertzel's discrete Fourier transform processor coupled to an output of the second bandpass filter; and
   an adder coupled to an output of the first Goertzel's discrete Fourier transform processor, and to an output of the second Goertzel's discrete Fourier transform processor.

2. The frequency shift keyed demodulator system of claim 1 further comprising:
   a low pass filter having a cutoff frequency, and coupled to an output of the adder.

3. The frequency shift keyed demodulator system of claim 1 wherein:
   said first bandpass filter has a passband centered at 2025 Hertz; and
   said second bandpass filter has a passband centered at 2225 Hertz.

4. The frequency shift keyed demodulator system of claim 1 wherein:
   said first bandpass filter includes first means for performing a decimation in time; and
   said second bandpass filter includes second means for performing a decimation in time.

5. The frequency shift keyed demodulator system of claim 4 wherein:
   said first means for performing a decimation in time includes means for performing a three-times decimation in time; and
   said second means for performing a decimation in time includes means for performing a three-times decimation in time.

6. The frequency shift keyed demodulator system of claim 1 wherein:
   said first Goertzel's discrete Fourier transform processor includes first means for determining a four-point modified Goertzel's algorithm; and
   said second Goertzel's discrete Fourier transform processor includes second means for determining a four-point modified Goertzel's algorithm.

7. A method for demodulation of a frequency shift keyed signal comprising:
   filtering an input signal with a first bandpass filter;
   filtering the input signal with a second bandpass filter;
   performing a first Goertzel's discrete Fourier transform on a first output signal from the first bandpass filter; and
   performing a second Goertzel's discrete Fourier transform on a second output signal from the second bandpass filter.

8. The method of claim 7 wherein:
   said filtering said input signal using said first bandpass filter includes performing a first decimation in time; and
   said filtering said input signal using said second bandpass filter includes performing a second decimation in time.

9. The method of claim 8 wherein:
   said filtering using said first bandpass filter includes performing a first three-times decimation in time; and
   said filtering using said second bandpass filter includes performing a second three-times decimation in time.

10. The method of claim 7 wherein:
    said performing a first Goertzel's discrete Fourier transform includes performing a first four-point Goertzel's discrete Fourier transform; and
    said performing a second Goertzel's discrete Fourier transform includes performing a second four-point Goertzel's discrete Fourier transform.

* * * * *